(12) United States Patent
Kim et al.

(10) Patent No.: US 8,897,357 B2
(45) Date of Patent: Nov. 25, 2014

(54) IMAGE ENCODING/DECODING METHOD AND DEVICE USING COEFFICIENTS OF ADAPTIVE INTERPOLATION FILTER

(75) Inventors: Hayoon Kim, Seongnam-si (KR); Donghoon Han, Seoul (KR); Kioh Kim, Anyang-si (KR); Daeyeon Kim, Seoul (KR); Yunglyul Lee, Seoul (KR); Joohee Moon, Seoul (KR); Haekwang Kim, Seoul (KR); Byeungwoo Jeon, Seongnam-si (KR)

(73) Assignee: SK Telecom Co., Ltd., Seoul (KR)

( * ) Notice: Subject to any disclaimer, the term of this patent is extended or adjusted under 35 U.S.C. 154(b) by 486 days.

(21) Appl. No.: 13/125,956

(22) PCT Filed: Oct. 16, 2009

(86) PCT No.: PCT/KR2009/005963
§ 371 (c)(1),
(2), (4) Date: Apr. 25, 2011

(87) PCT Pub. No.: WO2010/047498
PCT Pub. Date: Apr. 29, 2010

(65) Prior Publication Data
US 2011/0200099 A1 Aug. 18, 2011

(30) Foreign Application Priority Data
Oct. 24, 2008 (KR) .................. 10-2008-0104515

(51) Int. Cl.
*H04N 7/26* (2006.01)
*H04N 19/14* (2014.01)
*H04N 19/51* (2014.01)
*H04N 19/117* (2014.01)
*H04N 19/176* (2014.01)
*H04N 19/61* (2014.01)

(52) U.S. Cl.
CPC ... *H04N 19/00157* (2013.01); *H04N 19/00739* (2013.01); *H04N 19/00066* (2013.01); *H04N 19/00278* (2013.01); *H04N 19/00781* (2013.01)
USPC .............................. 375/240.02; 375/E7.126

(58) Field of Classification Search
CPC .................. H04N 19/00739; H04N 19/00066; H04N 19/00157; H04N 19/00278; H04N 19/00781
USPC ........................................................ 375/240
See application file for complete search history.

(56) References Cited

U.S. PATENT DOCUMENTS 5,828,782 A * 10/1998 Sunakawa et al. ............. 382/173
7,308,145 B2 * 12/2007 Abe et al. ...................... 382/233

(Continued)

FOREIGN PATENT DOCUMENTS

KR  10-2007-0027236   3/2007
KR  10-2008-0041935   5/2008

OTHER PUBLICATIONS

International Search Report mailed Jun. 8, 2010 for PCT/KR2009/005963.

*Primary Examiner* — Andy Rao
*Assistant Examiner* — Nguyen Truong
(74) *Attorney, Agent, or Firm* — Lowe Hauptman & Ham, LLP (57) ABSTRACT

An image encoding/decoding method and apparatus using coefficients of an adaptive interpolation filter are disclosed including: a coefficient calculator for calculating adaptive interpolation filter coefficient of a current frame; an image encoder for interpolating reference frames using the adaptive interpolation filter coefficient of the current frame and encoding the current frame using the interpolated reference frames; a filter flag encoder for generating and encoding a coefficient-inserted flag or coefficient non-inserted flag as a filter flag according to the adaptive interpolation filter coefficient of the current frame; a coefficient encoder for encoding the adaptive interpolation filter coefficient of the current frame when the filter flag is a coefficient-inserted flag; and a bit stream generator for generating and outputting a bit stream, which includes the encoded current frame and encoded filter flag, and further includes encoded adaptive interpolation filter coefficient of the current frame when the filter flag is the coefficient-inserted flag.

15 Claims, 7 Drawing Sheets

(56) References Cited

U.S. PATENT DOCUMENTS

| | | |
|---|---|---|
| 7,349,473 B2 * | 3/2008 | Hallapuro et al. ....... 375/240.12 |
| 8,090,031 B2 * | 1/2012 | Wong et al. .............. 375/240.29 |
| 2004/0076333 A1 * | 4/2004 | Zhang et al. .................. 382/238 |
| 2010/0135398 A1 * | 6/2010 | Wittmann et al. ....... 375/240.16 |

* cited by examiner

REFERENCE FRAME 29 30 31 32 33 34

CURRENT FRAME

M × N MATRIX

| f1 x f1 | f1 x f2 | f1 x f3 | f1 x f4 | f1 x f5 | f1 x f6 |
|---|---|---|---|---|---|
| f2 x f1 | f2 x f2 | f2 x f3 | f2 x f4 | f2 x f5 | f2 x f6 |
| f3 x f1 | f3 x f2 | f3 x f3 | f3 x f4 | f3 x f5 | f3 x f6 |
| f4 x f1 | f4 x f2 | f4 x f3 | f4 x f4 | f4 x f5 | f4 x f6 |
| f5 x f1 | f5 x f2 | f5 x f3 | f5 x f4 | f5 x f5 | f5 x f6 |
| f6 x f1 | f6 x f2 | f6 x f3 | f6 x f4 | f6 x f5 | f6 x f6 |

A

INTERPOLATION FILTER COEFFICIENT

| h0 |
|---|
| h1 |
| h2 |
| h3 |
| h4 |
| h5 | h

N VECTOR

| X x f1 |
|---|
| X x f2 |
| X x f3 |
| X x f4 |
| X x f5 |
| X x f6 |

B $A \times h = B$

IMAGE ENCODING/DECODING METHOD AND DEVICE USING COEFFICIENTS OF ADAPTIVE INTERPOLATION FILTER

CROSS REFERENCE TO RELATED APPLICATION

This application claims the priority of Korean Patent Application No. 10-2008-0104515, filed on Oct. 24, 2008, in the KIPO (Korean Intellectual Property Office), the disclosure of which is incorporated herein in their entirety by reference. Further, this application is the National Phase application of International Application No. PCT/KR2009/005963, filed Oct. 16, 2009, which designates the United States and was published in Korean. Each of these applications is hereby incorporated by reference in their entirety into the present application.

TECHNICAL FIELD

The present disclosure relates to an image encoding/decoding method and device using coefficients of an adaptive interpolation filter. More particularly, the present disclosure relates to a method and an apparatus for image encoding/decoding, which can improve the encoding efficiency or the compression efficiency by adaptively determining coefficients of an interpolation filter in encoding an image while reducing the quantity of bits for encoding of information on the adaptively determined filter coefficients.

BACKGROUND ART

The statements in this section merely provide background information related to the present disclosure and may not constitute the prior art.

Moving Picture Experts Group (MPEG) and Video Coding Experts Group (VCEG) have developed an improved and excellent video compression technology over existing MPEG-4 Part 2 and H.263 standards. The new standard is named H.264/AVC (Advanced Video Coding) and was released simultaneously as MPEG-4 Part 10 AVC and ITU-T Recommendation H.264.

In H.264/AVC (hereinafter referred to as 'H.264'), in order to interpolate a reference frame used in the inter prediction, a reference frame interpolated with ¼ fractional pixel precision is generated using a 6-tap filter and an average value filter. More specifically, the 6-tap filter is used so as to generate the ½ fractional pixel and the average value filter is used so as to generate the ¼ fractional pixel. As described above, when the inter prediction is performed based on H.264, a motion is predicted and compensated with the ¼ fractional pixel precision by using the reference frame interpolated in the fractional pixel precision, so that it is possible to obtain the higher compression efficiency than the conventional method which uses only the reference frame having the integer pixel precision.

Further, in H.264, not only fixed filter coefficients may be used for an interpolation of a reference image with the fractional pixel precision, but the coefficients of the interpolation filter may also be adaptively determined at each frame for the interpolation of a reference image. To this end, H.264 encodes the image of each frame by using the conventional fixed filter coefficients, so as to find motion information and information (including the block type and the block shape) of each block mode. In this event, if the block mode is an inter block mode, information required for obtaining the coefficients of the interpolation filter is accumulated and the encoded information is not included in the bit stream. When the encoding for one frame is completed, coefficients of the interpolation filter are generated by using the accumulated information, a reference image is interpolated by using the generated coefficients, and an image is then encoded by using the interpolated reference image.

However, since the filter coefficients obtained at every frame in the way described above are not optimum for all the inter block modes, they may cause degradation in the encoding efficiency. Moreover, since the filter coefficients determined at every frame should be transmitted to an image decoding apparatus by an image encoding apparatus, they may increase the bit rate.

DISCLOSURE

Technical Problem

Therefore, the present disclosure has been made in an effort to adaptively determine coefficients of an interpolation filter in encoding an image, simultaneously while reducing the quantity of bits for encoding of information on the adaptively determined filter coefficients, thereby improving the encoding efficiency or the compression efficiency.

Technical Solution

One aspect of the present disclosure provides an apparatus for image encoding apparatus including: a coefficient calculator for calculating an adaptive interpolation filter coefficient of a current frame; an image encoder for interpolating reference frames by using the adaptive interpolation filter coefficient of the current frame and encoding the current frame by using the interpolated reference frames; a filter flag encoder for generating and encoding a coefficient-inserted flag or a coefficient non-inserted flag as a filter flag according to the adaptive interpolation filter coefficient of the current frame; a coefficient encoder for encoding the adaptive interpolation filter coefficient of the current frame when the filter flag is a coefficient-inserted flag; and a bit stream generator for generating and outputting a bit stream, which includes the encoded current frame and the encoded filter flag, and further includes the encoded adaptive interpolation filter coefficient of the current frame when the filter flag is the coefficient-inserted flag.

Another aspect of the present disclosure provides a method for image encoding method including: calculating an adaptive interpolation filter coefficient of a current frame; encoding the current frame by using interpolated reference frames after interpolating the reference frames by using the adaptive interpolation filter coefficient of the current frame; generating and encoding a coefficient-inserted flag or a coefficient non-inserted flag as a filter flag according to the adaptive interpolation filter coefficient of the current frame; encoding the adaptive interpolation filter coefficient of the current frame when the filter flag is a coefficient-inserted flag; and generating and outputting a bit stream, which includes the encoded current frame and the encoded filter flag, and further includes the encoded adaptive interpolation filter coefficient of the current frame when the filter flag is the coefficient-inserted flag.

Yet another aspect of the present disclosure provides an image decoding apparatus including: a filter flag decoder for extracting and decoding an encoded filter flag from a bit stream, to reconstruct and output a filter flag; a coefficient decoder for, when the reconstructed filter flag is a coefficient-inserted flag, extracting and decoding an encoded adaptive interpolation filter coefficient of a current frame from the bit stream, to reconstruct the adaptive interpolation filter coefficient of the current frame; an image decoder for extracting an encoded current frame from the bit stream, interpolating a reference frame by using the reconstructed adaptive interpolation filter coefficient of the current frame or an interpolation filter coefficient of another frame according to the filter flag, and decoding the encoded current frame by using the interpolated reference frame, to reconstruct and output the current frame.

Yet another aspect of the present disclosure provides an image decoding method including: extracting and decoding an encoded filter flag from a bit stream, to reconstruct and output a filter flag; when the reconstructed filter flag is a coefficient-inserted flag, extracting and decoding an encoded adaptive interpolation filter coefficient of a current frame from the bit stream, to reconstruct the adaptive interpolation filter coefficient of the current frame; extracting an encoded current frame from the bit stream, interpolating a reference frame by using the reconstructed adaptive interpolation filter coefficient of the current frame or an interpolation filter coefficient of another frame according to the filter flag, and decoding the encoded current frame by using the interpolated reference frame, to reconstruct and output the current frame.

Advantageous Effects

As described above, the present disclosure can adaptively determine coefficients of an interpolation filter in encoding an image, simultaneously while reducing the quantity of bits for encoding of information on the adaptively determined filter coefficients, thereby improving the encoding efficiency or the compression efficiency.

MODE FOR INVENTION

Hereinafter, aspects of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Also, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

Figure 1:
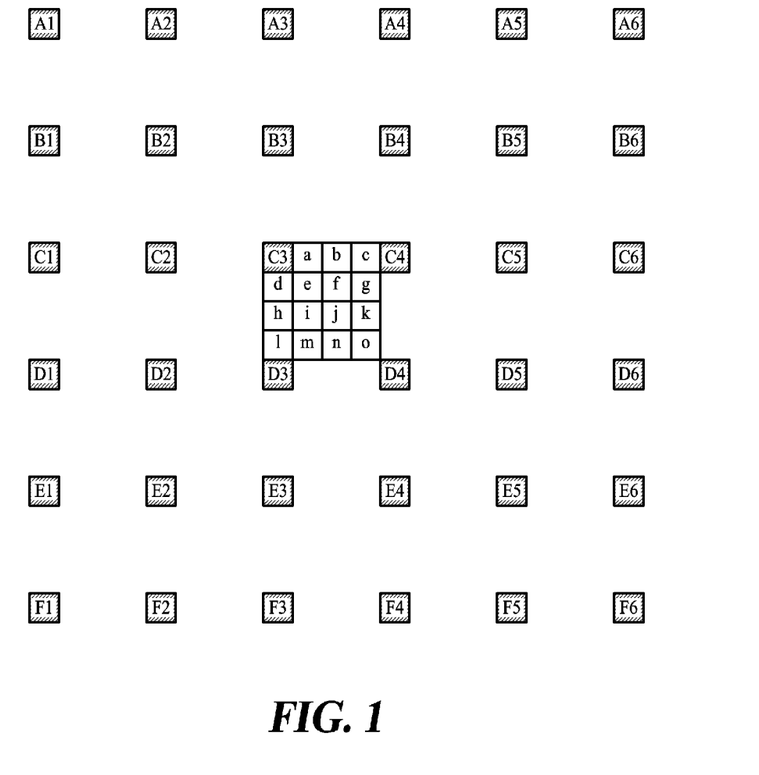
FIG. 1 is an exemplary diagram of a relation between a reference frame interpolated by the unit of fractional pixel and a pixel position of an integer pixel.

FIG. 1 is an exemplary diagram of a relation between a reference frame interpolated by the unit of fractional pixel and a pixel position of an integer pixel.

Referring to FIG. 1, An, Bn, Cn, Dn, En, and Fn refer to integer pixels (wherein, n=1, 2, 3, 4, and 5), and b, h, and j refer to ½ fractional pixels generated by 6-tap filtering the integer pixels. The 6-tap filter has coefficients of (1, −5, 20, 20, −5, 1)/32 for the 6-tap filtering. By applying the 6-tap filter to the six integer pixels in a vertical or horizontal direction and 6-tap filtering the six integer pixels, the ½ fractional pixels are generated. For example, it is possible to obtain the ½ fractional pixel (b) by applying the 6-tap filter to the horizontal integer pixels C1, C2, C3, C4, C5, and C6, which can be expressed by Equation 1.

$$b = \text{round}((C1 - 5 \times C2 + 20 \times C3 + 20 \times C4 - 5 \times C5 + C6)/32) \quad \text{Equation 1}$$

Herein, round( ) refers to a round-off calculation into an integer. Remaining ¼ fractional pixels a, c, d, e, f, g, i, k, l, m, n, and o, except for b, h, and j, are generated by average value filtering of the integer pixels and the ½ fractional pixels. For example, by the average value filtering of integer pixel C3 and ½ fractional pixel (b), ¼ fractional pixel (a) is linearly interpolated and generated. This can be expressed by Equation 2.

$$a = \text{round}((C1 + b)/2) \quad \text{Equation 2}$$

As described above, in the compression technology, such as H.264, by way of the generation of ½ fractional pixels by using integer pixels and the generation of ¼ fractional pixels by using integer pixels and ½ fractional pixels, a reference frame interpolated by the unit of ¼ fractional pixel as illustrated in FIG. 1 is generated and the motion prediction for the inter prediction is performed using the interpolated reference frames.

In H.264, when an inter block is predicted, a motion prediction and compensation is performed with the fractional pixel precision by using the interpolated reference frame as described above. Therefore, it is possible to obtain a higher compression efficiency than the conventional method which performs a motion prediction and compensation with the integer pixel precision. However, when the reference frame is interpolated by using fixed filter coefficients, such as 6-tap filter coefficients, it is impossible to obtain an optimum performance due to the lack of consideration in the aliasing, camera noise, block mode (or attributes according to the block mode), etc.

To this end, an adaptive interpolation filter technique has been developed, and refers to a technique of interpolating a reference frame by using optimum interpolation filter coefficients determined at every frame instead of fixed filter coefficients. Use of the adaptive interpolation filter technique not only can solve the problems, which can be caused by the user of fixed filter coefficients, but can also minimize the prediction errors, thereby further improving the compression efficiency.

However, even in the adaptive interpolation filter technique, since the interpolation filter coefficients determined at every frame are not optimum for all the inter blocks, the interpolation filter coefficients determined at every frame should be transmitted to an image decoding apparatus, which may increase the bit rate and thereby degrade the compression efficiency.

Figure 2:
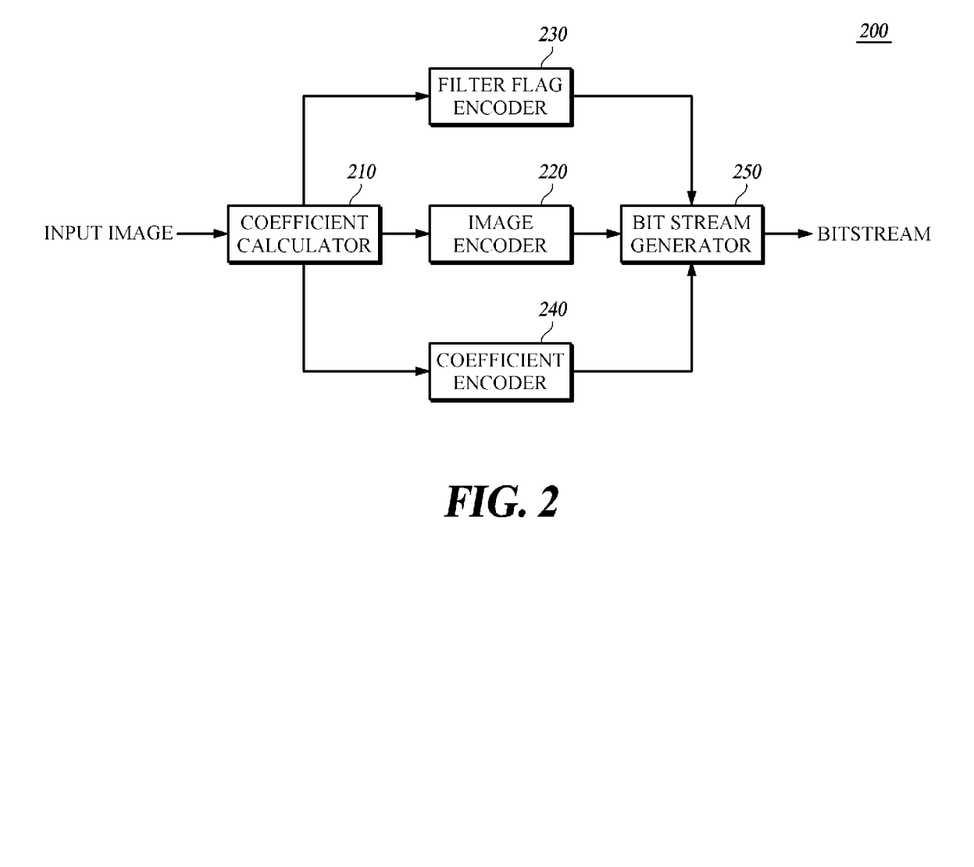
FIG. 2 is a schematic block diagram of a construction of an image encoding apparatus according to an aspect of the present disclosure.

FIG. 2 is a schematic block diagram illustrating a construction of an image encoding apparatus according to an aspect of the present disclosure.

Referring to FIG. 2, the image encoding apparatus 200 according to an aspect of the present disclosure includes a coefficient calculator 210, an image encoder 220, a filter flag encoder 230, a coefficient encoder 240, and a bit stream generator 250. The image encoding apparatus 200 may be a Personal Computer (PC), a notebook computer, a Personal Digital Assistant (PDA), a Portable Multimedia Player (PMP), a PlayStation Portable (PSP), a mobile communication terminal, etc. Further, the image encoding apparatus 200 refers to various devices including a communication device apparatus, such as a communication modem, for communicating with various devices or a wired/wireless communication network, a memory for storing various programs and data for encoding an image, and a microprocessor, etc., for calculating and controlling by executing a program.

The coefficient calculator 210 calculates an adaptive interpolation filter coefficient of a current frame. That is, for every frame of an input image, the coefficient calculator 210 adaptively calculates an interpolation filter coefficient of a current frame to be currently encoded, thereby outputting an adaptive interpolation filter coefficient.

To this end, the coefficient calculator 210 accumulates information for calculating an interpolation filter coefficient for a current frame of an input image and calculates an interpolation filter coefficient of the current frame by using the accumulated information. For example, the coefficient calculator 210 accumulates the N×M matrix, which indicates multiplication between pixels of reference frames indicated by motion vectors of the current block to be currently encoded in the current frame, and the N vector, which indicates multiplication between a current pixel and pixels of reference frames indicated by motion vectors of the current block, as information for calculation of interpolation filter coefficients for the current frame. In this event, the motion vector may be determined after interpolation of the reference frames by using a fixed interpolation filter employed in H.264.

Figure 3:
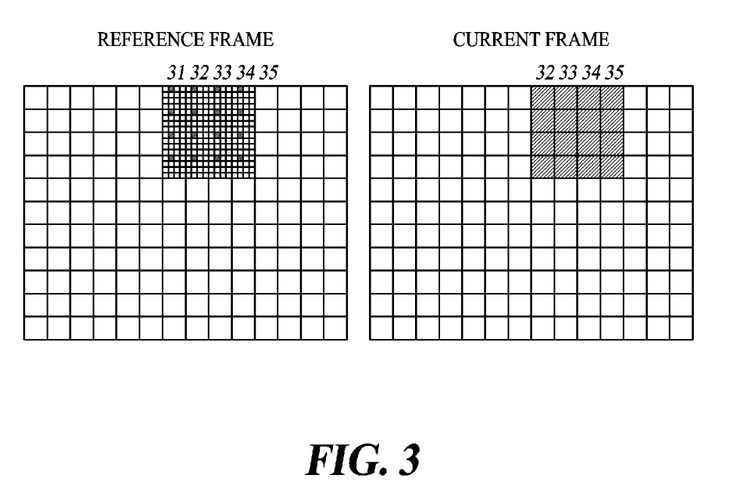
FIG. 3 illustrates an example of a current block of a current frame together with blocks of reference frames interpolated by the unit of fractional pixels.

FIG. 3, which illustrates an example of a current block of a current frame together with blocks of reference frames interpolated by the unit of fractional pixels, shows pixels most similar to the current block on an assumption that a motion vector of the current block determined by the unit of ¼ fractional pixel is (−3,0) when the motion vector of the current block, which is a 4×4 sub-block, is determined by using reference frames interpolated by using the fixed interpolation filter employed in H.264.

Figure 4A:
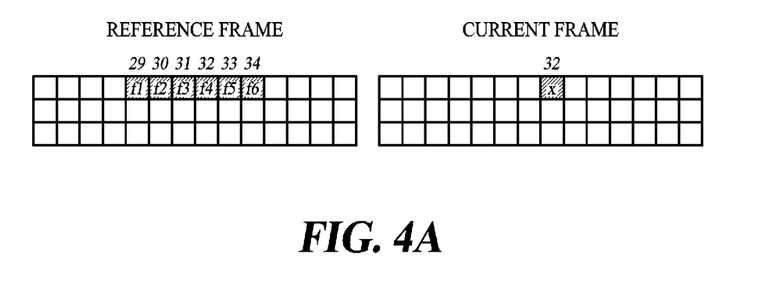
FIGS. 4A and 4B are views for describing an exemplary process of calculating interpolation filter coefficients by using the N×M matrix and the N vector.
Figure 4B:
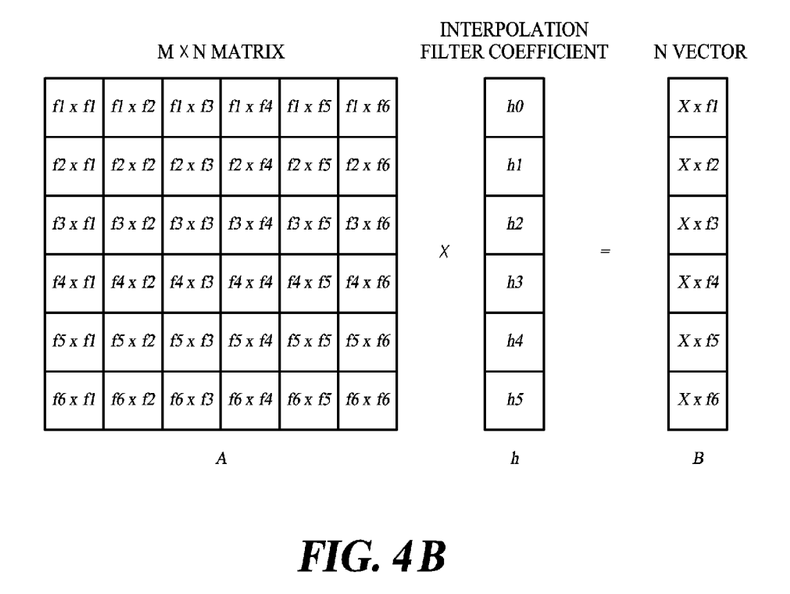

A motion vector in the unit of integer pixel, which has been transformed from the motion vector in the unit of ¼ fractional pixel of the current block shown in FIG. 3, is (−1,0), and 6 pieces of pixel information are necessary in order to calculate 6 filter coefficients. Therefore, referring to FIGS. 4A and 4B for describing an exemplary process of calculating interpolation filter coefficients by using the N×M matrix and the N vector, the N×M matrix and the N vector as shown in FIG. 4B may be calculated and accumulated as information by using pixel values of the pixels located at (29,0)~(34,0) of the reference frames and the pixel located at (32,0) of the current frame shown in FIG. 4A. Likewise, the N×M matrix and the N vector for the pixel located at (33,0) of the current frame may be calculated and accumulated as information by using the 6 pixel values of the pixels located at (30,0)~(35,0) of the reference frames.

In other words, products of multiplication between pixel values of pixels of reference frames are calculated and then accumulated as the N×M matrix, and products of multiplication between pixel values of pixels of reference frames indicated by the motion vectors and pixels of the current frame are then calculated and accumulated as the N vector. Thereafter, when the products for all the pixels have been accumulated, the interpolation filter coefficients are calculated. Although the above description is based on an assumption that the adaptive interpolation filter coefficient is calculated accumulating and using the N×M matrix and the N vector, any information capable of calculating the interpolation filter coefficient, as well as the N×M matrix and the N vector, may be accumulated and used for calculation of the adaptive interpolation filter coefficient.

Further, the coefficient calculator 210 may calculate an adaptive interpolation filter coefficient of a current frame according to one or more combinations of a block mode of the current frame and a block mode set of the current frame. That is, the coefficient calculator 210 accumulates information for calculating the adaptive interpolation filter coefficient of a current frame according to one or more combinations of a block mode of the current frame and a block mode set of the current frame, and calculates an adaptive interpolation filter coefficient of the current frame by using the accumulated information. In this event, the block mode set refers to a set of multiple block modes, and all block modes of the current frame may be grouped into one block mode set or multiple block mode sets, for each of which the adaptive interpolation filter coefficient may be calculated. Here, under the H.264/AVC standard, the multiple block modes may be the SKIP mode, the inter 16×16 mode, the inter 16×8 mode, the inter 8×16 mode, the inter 8×8 mode, the inter 8×4 mode, the inter 4×8 mode, the inter 4×4 mode, the intra 16×16 mode, the intra 4×4 mode, etc., but they are not limited thereto and may include other various block modes.

The image encoder 220 interpolates the reference frames by using the adaptive interpolation filter coefficient of the current frame and encodes the current frame by using the interpolated reference frames. Specifically, the image encoder 220 interpolates the reference frames by using the adaptive interpolation filter coefficient of the current frame output from the coefficient calculator 210. Further, by using the interpolated reference frames, the image encoder 220 performs motion prediction and compensation of each block of the current frame to generate a predicted block of each block, and encodes each residual block generated through subtraction between each block and a corresponding predicted block, thereby outputting an encoded current frame obtained by encoding the current frame. The process of encoding the current frame by using the adaptive interpolation filter coefficient of the current frame calculated by the coefficient calculator 210 is obvious to one skilled in the art, so a detailed description thereof is omitted here.

The filter flag encoder 230 generates and encodes a coefficient-inserted flag or a coefficient non-inserted flag as a filter flag according to the adaptive interpolation filter coefficient of the current frame. Specifically, the filter flag encoder 230 determines whether to encode and transmit the adaptive interpolation filter coefficient of the current frame according to the adaptive interpolation filter coefficient of the current frame output from the coefficient calculator 210. Then, the filter flag encoder 230 generates a coefficient-inserted flag as the filter flag when it has determined to encode and transmit the adaptive interpolation filter coefficient, and generates a coefficient non-inserted flag as the filter flag when it has determined not to encode and transmit the adaptive interpolation filter coefficient. Then, the filter flag encoder 230 encodes the generated filter flag.

For example, the filter flag encoder 230 may generate a coefficient non-inserted flag as the filter flag when an interpolation filter coefficient difference, which is the difference between an adaptive interpolation filter coefficient of the current frame and an interpolation filter coefficient of another frame, is smaller than or equal to a preset threshold, and may generate a coefficient inserted flag as the filter flag when the interpolation filter coefficient difference is larger than the preset threshold. In this event, another frame may be a frame encoded before the current frame is encoded.

That is, as in the example described above, when it is determined that the adaptive interpolation filter coefficient generated in the previous frame is similar to the adaptive interpolation filter coefficient of the current frame and the interpolation and encoding of the reference frames by using the adaptive interpolation filter coefficient of the previous frame do not show a big difference in the compression efficiency, it is possible to omit the transmission of the adaptive interpolation filter coefficient of the current frame to an image decoding apparatus, which may reduce the bit rate and thereby improve the compression efficiency.

In this event, if the filter flag is set to be a binary digit having 1 bit, such as "0" or "1" (for example, when the coefficient-inserted flag is "1" and the coefficient non-inserted flag is "0", or vice versa), the filter flag may not be additionally encoded. However, when the filter flag is set to be or another type of information or multiple bits, such as "000" or "111", the filter flag may be encoded into a binary digit. Further, the filter flag encoder 230 may set the filter flag for each block mode or each block mode set, and may set one filter flag for one frame when the current frame has a single block mode set.

The coefficient encoder 240 encodes an adaptive interpolation filter coefficient of the current frame when the filter flag is a coefficient-inserted flag. That is, when the filter flag of the current frame or each block (or each block set) of the current frame is set as a coefficient-inserted flag by the coefficient calculator 210, the coefficient encoder 240 encodes the adaptive interpolation filter coefficient of the current frame output by the coefficient calculator 210, to output an encoded adaptive interpolation filter coefficient of the current frame. In this event, the coefficient encoder 240 may use various encoding schemes including the entropy encoding scheme for the encoding of the interpolation filter coefficient of the current frame.

The bit stream generator 250 generates and outputs a bit stream, which includes an encoded current frame and an encoded filter flag, and further includes an encoded adaptive interpolation filter coefficient of the current frame when the filter flag is a coefficient-inserted flag. In other words, the bit stream generator 250 basically generates and outputs a bit stream, which includes an encoded current frame output from the image encoder 220 and an encoded filter flag output from the filter flag encoder 230. When the filter flag output from the filter flag encoder 230 is a coefficient non-inserted flag, the bit stream generator 250 outputs the generated bit stream without change. However, when the filter flag output from the filter flag encoder 230 is a coefficient-inserted flag, the bit stream generator 250 outputs the bit stream after inserting the encoded adaptive interpolation filter coefficient of the current frame output from the coefficient encoder 240 in the bit stream.

In this event, the bit stream generator 250 may include one or more combinations of the encoded filter flag and the encoded adaptive interpolation filter coefficient of the current frame in a slice header of the bit stream. Further, when the adaptive interpolation filter coefficient has been calculated for each block mode, the bit stream generator 250 may include one or more combinations of the encoded filter flag and the encoded adaptive interpolation filter coefficient of the current frame in a block header of the bit stream.

Figure 5:
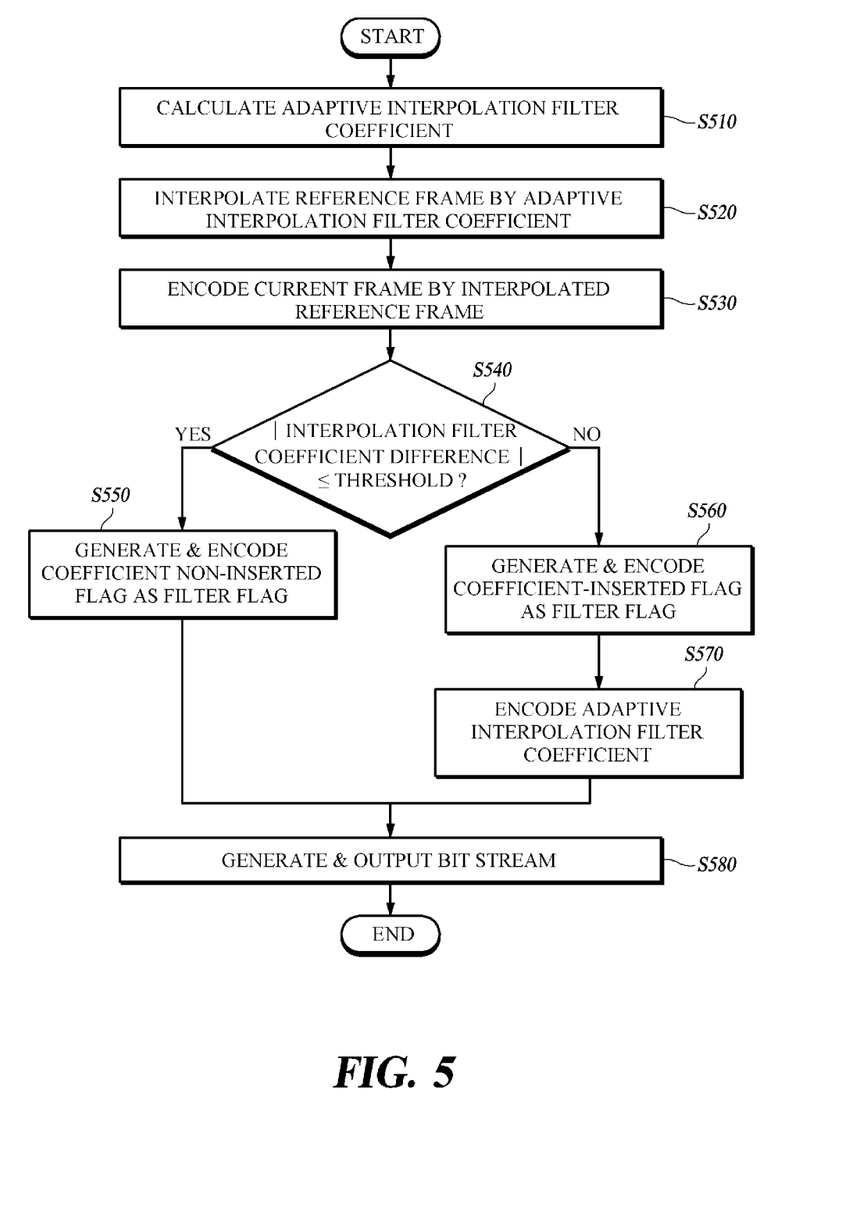
FIG. 5 is a flowchart for describing an image encoding method according to an aspect of the present disclosure.

FIG. 5 is a flowchart for describing an image encoding method according to an aspect of the present disclosure.

When there is an input image, the image encoding apparatus 200 encodes reference frames of a current frame to be currently encoded in the input image by using a fixed interpolation filter coefficient, to accumulate information for calculation of an adaptive interpolation filter coefficient and calculate the adaptive interpolation filter coefficient of the current frame by using the accumulated information (step S510), interpolates the reference frames by using the calculated adaptive interpolation filter coefficient of the current frame (step S520), and encodes the current frame by using the interpolated reference frames (step S530).

In order to set a filter flag, the image encoding apparatus 200 compares the adaptive interpolation filter coefficient of the current frame calculated in step S510 with a preset interpolation filter coefficient of another frame, to determine whether a difference or an absolute value of the difference between the two coefficients is smaller than or equal to a preset threshold (step S540), generates and encodes a coefficient non-inserted flag as a filter flag when the difference or an absolute value of the difference is smaller than or equal to the preset threshold (step S550), generates and encodes a coefficient-inserted flag as a filter flag when the difference or an absolute value of the difference is larger than the preset threshold (step S560), and then encodes the adaptive interpolation filter coefficient of the current frame (step S570).

According to whether the filter flag is a coefficient-inserted flag or a coefficient non-inserted flag, the image encoding apparatus 200 may generate and output a bit stream including the current frame encoded in step S530 and the filter flag encoded in step S550 or a bit stream including the current frame encoded in step S530, the filter flag encoded in step S560, and the adaptive interpolation filter coefficient of the current frame encoded in step S570 (step S580).

As described above, the image having been encoded into a bit stream by the image encoding apparatus 200 may be transmitted to an image decoding apparatus to be described later via a wired/wireless communication network, such as the internet, a local wireless communication network, a wireless LAN network, a Wibro (Wireless Broadband) network also known as WiMax network, and a mobile communication network, or a communication interface, such as a cable and a Universal Serial Bus (USB) in real time or in non-real time, so that the transmitted image can be decoded in the image decoding apparatus, and the decoded image can be reconstructed and reproduced.

Figure 6:
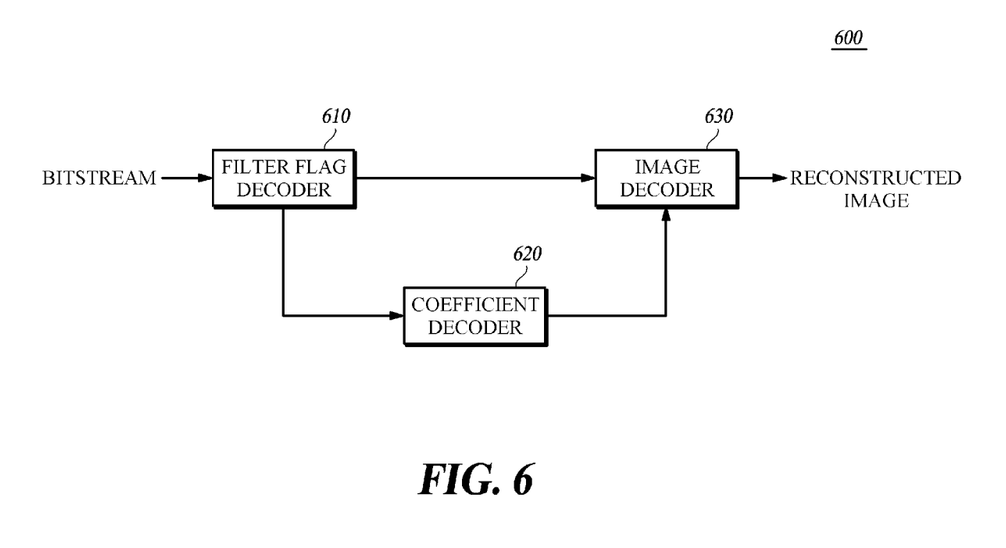
FIG. 6 is a schematic block diagram illustrating a construction of an image decoding apparatus according to an aspect of the present disclosure.

FIG. 6 is a schematic block diagram illustrating a construction of an image decoding apparatus according to an aspect of the present disclosure.

The image decoding apparatus 600 according to an aspect of the present disclosure includes a filter flag decoder 610, a coefficient decoder 620, and an image decoder 630. The image decoding apparatus 600 may be a Personal Computer (PC), a notebook computer, a Personal Digital Assistant (PDA), a Portable Multimedia Player (PMP), a PlayStation Portable (PSP), a mobile communication terminal, etc. Further, the image decoding apparatus 1000 refers to various devices including a communication device apparatus, such as a communication modem, for communicating with various devices or a wired/wireless communication network, a memory for storing various programs and data for encoding an image, and a microprocessor, etc., for calculating and controlling by executing a program.

The filter flag decoder 610 extracts and decodes an encoded filter flag from a bit stream, to reconstruct and output a filter flag. The filter flag decoder 610 may extract the encoded filter flag from either a slice header or a block header of the bit stream.

When the reconstructed filter flag is a coefficient-inserted flag, the coefficient decoder 620 extracts and decodes an encoded adaptive interpolation filter coefficient of a current frame from the bit stream, to reconstruct and output the adaptive interpolation filter coefficient of the current frame. In this event, the coefficient decoder 620 may extract the encoded adaptive interpolation filter coefficient of the current frame from the slice header of the bit stream. Further, the adaptive interpolation filter coefficient of the current frame reconstructed by the coefficient decoder 620 may be a coefficient calculated based on one or more combinations of a block mode of the current frame or a block mode set of the current frame, and may be a coefficient calculated by using an N×M matrix and an N vector accumulated based on one or more combinations of a block mode of the current frame or a block mode set of the current frame.

The image decoder 630 extracts an encoded current frame from the bit stream, interpolates a reference frame by using the reconstructed adaptive interpolation filter coefficient of the current frame or an interpolation filter coefficient of another frame according to the filter flag, and decodes the encoded current frame by using the interpolated reference frame, to reconstruct and output the current frame.

For example, when the filter flag output from the filter flag decoder 610 is a coefficient-inserted flag, the image decoder 630 interpolates reference frames by using the adaptive interpolation filter coefficient of the reconstructed current frame output from the coefficient decoder 620, and decodes the encoded current frame by using the interpolated reference frames. When the filter flag output from the filter flag decoder 610 is a coefficient non-inserted flag, the image decoder 630 interpolates reference frames by using an interpolation filter coefficient of another preset frame, and decodes the encoded current frame by using the interpolated reference frames. In this event, said another preset frame may be a frame decoded before the current frame is decoded. Meanwhile the decoding of an encoded current frame by using the interpolated reference frames by the image decoder 630 is obvious to one skilled in the art, so a detailed description thereof is omitted here.

Figure 7:
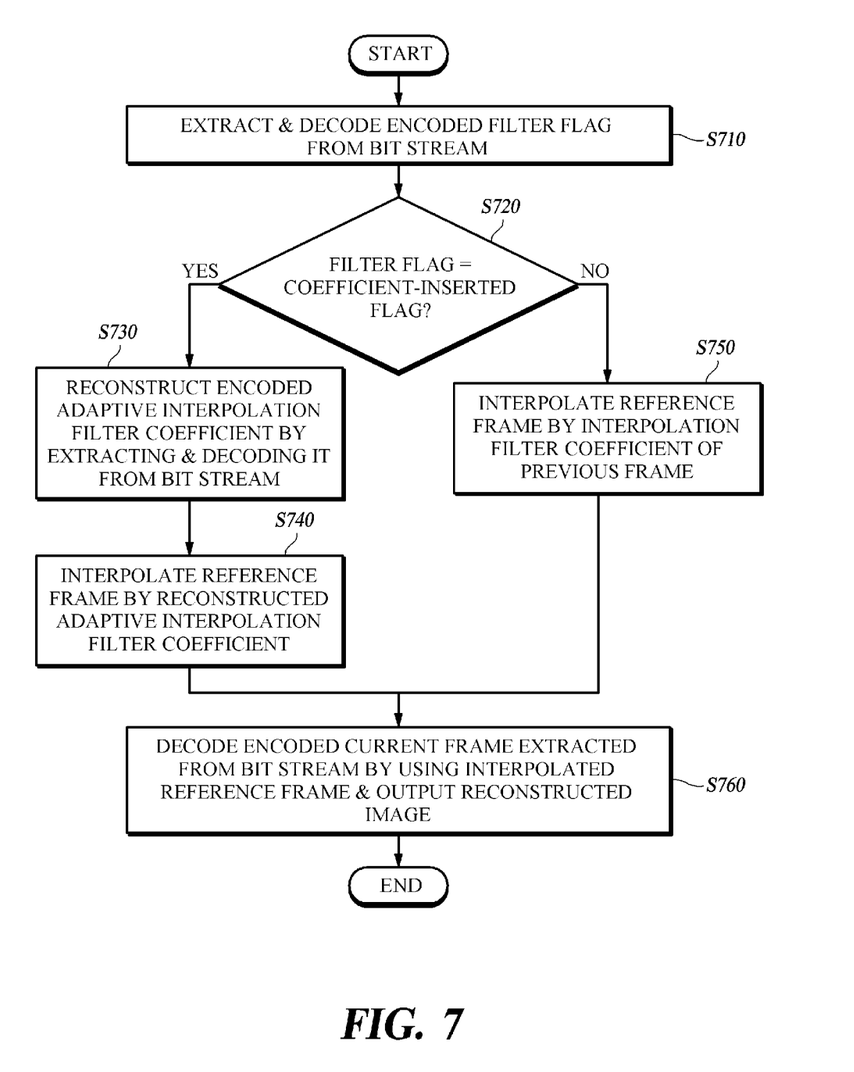
FIG. 7 is a flowchart for describing an image decoding method according to an aspect of the present disclosure.

FIG. 7 is a flowchart for describing an image decoding method according to an aspect of the present disclosure.

After receiving and storing a bit stream for an image through a wired/wireless communication network or cable, the image decoding apparatus 600 decodes and reconstructs the image in order to reproduce the image according to an algorithm of another program being executed or according to user's selection.

To this end, the image decoding apparatus 600 extracts an encoded filter flag from a bit stream and decodes the extracted filter flag, to reconstruct the filter flag (step S710), and determines whether the filter flag is a coefficient-inserted flag (step S720). Then, when the filter flag is a coefficient-inserted flag, the image decoding apparatus 600 extracts an encoded adaptive interpolation filter coefficient of the current frame from the bit stream, to reconstruct the adaptive interpolation filter coefficient of the current frame (step S730), and interpolates reference frames by using the reconstructed adaptive interpolation filter coefficient of the current frame (step S740). When the filter flag is a coefficient non-inserted flag, the image decoding apparatus 600 interpolates reference frames by using an interpolation filter coefficient of a next frame (for example, a previous frame decoded before the current frame) (step S750), and extracts an encoded current frame from the bit stream and decodes the current frame by using the reference frames interpolated in step S740 or step S750, to reconstruct the current frame and output the current frame as a reconstructed image (step S760).

In the description above, although all of the components of the aspects of the present disclosure may have been explained as assembled or operatively connected as a unit, the present disclosure is not intended to limit itself to such aspects. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the aspects of the present disclosure. As the computer readable media, the candidates include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary aspects of the present disclosure have been described for illustrative purposes, those skilled in the art will appreciate that various modifications, additions and substitutions are possible, without departing from essential characteristics of the disclosure. Therefore, exemplary aspects of the present disclosure have not been described for limiting purposes. Accordingly, the scope of the disclosure is not to be limited by the above aspects but by the claims and the equivalents thereof.

INDUSTRIAL APPLICABILITY

As described above, the present disclosure is highly useful for application in the fields of encoding and decoding an image, so as to adaptively determine coefficients of an interpolation filter in encoding an image, simultaneously while reducing the quantity of bits for encoding of information on the adaptively determined filter coefficients. Therefore, the present disclosure can improve the encoding efficiency or the compression efficiency.

The invention claimed is:
1. An image encoding apparatus, the apparatus comprising:
   a coefficient calculator configured to calculate adaptive interpolation filter coefficients of a current frame;
   an image encoder configured to
      interpolate a reference frame with a fractional pixel precision by using the adaptive interpolation filter coefficients of the current frame, and encode the current frame by using the interpolated reference frame;

a filter flag encoder configured to
determine whether to interpolate the reference frame by using adaptive interpolation filter coefficients of a previous frame based on a comparison between the adaptive interpolation filter coefficients of the current frame and the adaptive interpolation filter coefficients of the previous frame, and
encode a coefficient-inserted flag or a coefficient non-inserted flag as a filter flag into a bit stream based on the result of the determining; and a coefficient encoder configured to
encode the adaptive interpolation filter coefficients of the current frame into the bit stream when the filter flag is the coefficient-inserted flag, and
not encode the adaptive interpolation filter coefficients of the current frame into the bit stream when the filter flag is the coefficient non-inserted flag, wherein the coefficient non-inserted flag indicates that the adaptive interpolation filter coefficients of the previous frame are used as the adaptive interpolation filter coefficients of the current frame.

2. The image encoding apparatus of claim 1, wherein the filter flag encoder is configured to generate the coefficient non-inserted flag as the filter flag, when a difference between the adaptive interpolation filter coefficients of the current frame and the adaptive interpolation filter coefficients of said another the previous frame, is smaller than or equal to a preset threshold.

3. The image encoding apparatus of claim 1, wherein the filter flag encoder is configured to generate the coefficient-inserted flag as the filter flag when a difference between the adaptive interpolation filter coefficients of the current frame and the adaptive interpolation filter coefficients of the previous frame, is larger than a preset threshold.

4. The image encoding apparatus of claim 1, wherein the previous frame is a frame encoded before the current frame is encoded.

5. The image encoding apparatus of claim 1, wherein the coefficient calculator is configured to calculate the adaptive interpolation filter coefficient according to a block mode or a block mode set, by using information on pixels of a reference frame indicated by a motion vector of a block to be encoded in the current frame and pixels of the block to be encoded.

6. The image encoding apparatus of claim 1, wherein the coefficient calculator is configured to
interpolate a previously encoded reference frame by using preset interpolation filter coefficients,
encode a current block of the current frame by using the interpolated previously encoded reference frame, and
perform a calculation of the adaptive interpolation filter coefficients of the current frame by using pixels of the interpolated previously encoded reference frame and pixels of the current block,
wherein the calculation being performed per inter prediction block mode or each set of inter prediction block modes of the current frame.

7. The image encoding apparatus of claim 1, further comprising:
a bit stream generator configured to
generate the bit stream including the encoded current frame, the encoded filter flag and the encoded adaptive interpolation filter coefficients of the current frame, when the filter flag is the coefficient-inserted flag, and
generate the bit stream including the encoded current frame and the encoded filter flag but without the encoded adaptive interpolation filter coefficients of the current frame, when the filter flag is the coefficient non-inserted flag.

8. The image encoding apparatus of claim 7, wherein the bit stream generator is configured to generate at least one of the encoded filter flag and the encoded adaptive interpolation filter coefficients of the current frame included in a slice header of the bit stream.

9. An image encoding method, the method comprising:
calculating adaptive interpolation filter coefficients of a current frame;
encoding the current frame by using an interpolated reference frame after interpolating the reference frame with a fractional pixel precision by using the adaptive interpolation filter coefficients of the current frame;
determining whether to interpolate the reference frame by using adaptive interpolation filter coefficients of a previous frame, based on a comparison between the adaptive interpolation filter coefficients of the current frame and the adaptive interpolation filter coefficients of the previous frame;
encoding a coefficient-inserted flag or a coefficient non-inserted flag as a filter flag into a bit stream, based on the result of the determining; and
encoding the adaptive interpolation filter coefficients of the current frame into the bit stream when the filter flag is the coefficient-inserted flag,
wherein the bit stream includes the encoded current frame, the encoded filter flag and the encoded adaptive interpolation filter coefficients of the current frame, when the filter flag is the coefficient-inserted flag, and
wherein the bit stream includes the encoded current frame and the encoded filter flag but without the encoded adaptive interpolation filter coefficients of the current frame, when the filter flag is the coefficient non-inserted flag, wherein the coefficient non-inserted flag indicates that the adaptive interpolation filter coefficients of the previous frame are used as the adaptive interpolation filter coefficients of the current frame.

10. An image decoding apparatus, the apparatus comprising:
a filter flag decoder configured to extract and decode an encoded filter flag of a current frame from a bit stream, to reconstruct a filter flag;
a coefficient decoder configured to extract and decode, when the reconstructed filter flag is a coefficient-inserted flag, encoded adaptive interpolation filter coefficients of the current frame from the bit stream, to reconstruct the adaptive interpolation filter coefficients of the current frame;
an image decoder configured to
extract an encoded current frame from the bit stream,
interpolate a reference frame with a fractional pixel precision by using either of (i) the reconstructed adaptive interpolation filter coefficient of the current frame when the filter flag is the coefficient-inserted flag and (ii) previously reconstructed adaptive interpolation filter coefficients of a previous frame when the filter flag is a coefficient non-inserted flag, wherein the coefficient non-inserted flag indicates that the previously reconstructed adaptive interpolation filter coefficients of the previous frame are used as the reconstructed adaptive interpolation filter coefficients of the current frame, and decode the encoded current frame by using the interpolated reference frame, to reconstruct the current frame.

11. The image decoding apparatus of claim 10, wherein the previous frame is a frame decoded before the current frame is decoded.

12. The image decoding apparatus of claim 10, wherein the filter flag decoder is configured to extract the encoded filter flag from a slice header of the bit stream.

13. The image decoding apparatus of claim 10, wherein the coefficient decoder is configured to extract the encoded adaptive interpolation filter coefficients from a slice header of the bit stream.

14. An image decoding method, the method comprising:
 extracting and decoding an encoded filter flag of a current frame from a bit stream, to reconstruct a filter flag;
 extracting and decoding, when the reconstructed filter flag is a coefficient-inserted flag, extracting and decoding an encoded adaptive interpolation filter coefficients of the current frame from the bit stream, to reconstruct the adaptive interpolation filter coefficients of the current frame;
 extracting an encoded current frame from the bit stream
 interpolating a reference frame with a fractional pixel precision by using either of (i) the reconstructed adaptive interpolation filter coefficients of the current frame when the filter flag is the coefficient-inserted flag and (ii) previously reconstructed interpolation filter coefficients of a previous frame when the filter flag is a coefficient non-inserted flag, wherein the coefficient non-inserted flag indicates that the previously reconstructed adaptive interpolation filter coefficients of the previous frame are used as the reconstructed adaptive interpolation filter coefficients of the current frame; and
 decoding the encoded current frame by using the interpolated reference frame, to reconstruct the current frame.

15. The image encoding method of claim 9, wherein said calculating the adaptive interpolation filter coefficients comprises
 interpolating a previously encoded reference frame by using preset interpolation filter coefficients,
 encoding a current block of the current frame by using the interpolated previously encoded reference frame, and
 performing a calculation of the adaptive interpolation filter coefficients of the current frame by using pixels of the interpolated previously encoded reference frame and pixels of the current block,
 wherein the calculation being performed per inter prediction block mode or each set of inter prediction block modes of the current frame.

\* \* \* \* \*